3,177,208
PRODUCTION OF COMPOUNDS OF THE
1,4-DIVINYLBENZENE SERIES
Walter Stilz and Horst Pommer, Ludwigshafen (Rhine),
Germany, assignors to Badische Anilin- & Soda-Fabrik
Aktiengesellschaft, Ludwigshafen (Rhine), Germany
No Drawing. Filed May 12, 1960, Ser. No. 28,546
Claims priority, application Germany, May 15, 1959,
B 53,252; Mar. 15, 1960, B 57,060
8 Claims. (Cl. 260—240)

This invention relates to a process for the production of compounds of the 1,4-divinylbenzene series, especially the reaction of bis-phosphonates or bisphosphinates of the araliphatic series with compounds containing carbonyl groups.

Compounds of the 1,4-divinylbenzene series are at present only known to a small extent because they are relatively difficultly accessible. They can be obtained for example in moderate yields by reaction of terephthalic dialdehyde with suitable Grignard compounds and dehydration of the diols thus formed. A disadvantage of this method is that initial materials having additional functional groups capable of reacting with Grignard compounds cannot be reacted. Moreover the choice of suitable initial materials is dependent to a great extent on steric conditions. The process for the production of 1,4-divinylbenzene compounds based on the principle of the Perkin synthesis also leads only to unsatisfactory results.

It is an object of the present invention to provide a process for the production of compounds of the 1,4-divinylbenzene series from readily accessible initial materials. It is another object of the invention to prepare compounds of the 1,4-divinylbenzene series in good yields. It is a further object of the invention to provide a process for the production of substituted compounds of the 1,4-divinylbenzene series.

These and other objects and advantages of the invention are achieved by reacting a compound of the general formula:

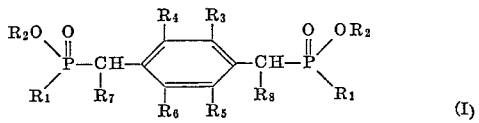

with a compound containing a carbonyl group in the presence of a proton acceptor. In the above Formula I $R_1$ represents an aliphatic, cycloaliphatic, aromatic or araliphatic radical, which may also be attached to the phosphorus atom by way of oxygen, $R_2$ an aliphatic, cycloaliphatic, aromatic or araliphatic radical, $R_3$, $R_4$, $R_5$ and $R_6$ hydrogen and/or identical or different aliphatic, cycloaliphatic, aromatic or araliphatic radicals, carboxyl, carbonamide, cyano, amino, nitro, sulfonic acid, alkoxy, aryloxy or mercapto groups which may be esterified, or halogen atoms, and $R_3$ and $R_4$ and/or $R_5$ and $R_6$ may be common members of a condensed-on ring, and $R_7$ and $R_8$ represent hydrogen and/or identical or different aliphatic, cycloaliphatic, aromatic or araliphatic radicals and carboxyl groups, carbonamide groups and cyano groups, which may be esterified.

In general the said aliphatic, cycloaliphatic, aromatic or araliphatic radicals are alkyl, cycloalkyl, aryl or aralkyl radicals. In the initial materials of the Formula I which are preferably used, $R_1$ represents a phenyl or an alkoxy group derived from a lower alcohol with 1 to 4 carbon atoms,
$R_2$ represents an alkyl group with up to 4 carbon atoms,
$R_3$ and $R_6$ are hydrogen, alkoxy groups derived from lower alcohols with up to 4 carbon atoms, alkyl groups with up to 4 carbon atoms and halogen atoms,
$R_4$ and $R_5$ represent hydrogen and
$R_7$ and $R_8$ represent hydrogen.

The production of the compounds of the Formula I, some of which have not hitherto become known, takes place by methods known per se, for example in a simple way by reaction of a compound of the general Formula II:

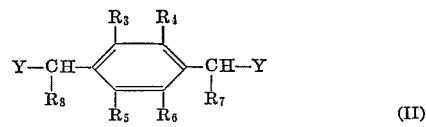

in which $R_3$, $R_4$, $R_5$, $R_6$, $R_7$ and $R_8$ have the same meanings as in the general Formula I and Y represents a halogen atom or the tosyloxy radical, with a phosphorus compound of the general Formula III:

in which $R_1$ and $R_2$ have the meanings given above for $R_1$ and $R_2$, and $R_9$ is defined like $R_2$.

As the phosphorus compounds III there may be used phosphorous acid esters of aliphatic, alicyclic, araliphatic alcohols or of phenols, or alkyl, aryl, cycloalkyl, or aralkyl phosphinic acid esters of aliphatic, alicyclic or araliphatic alcohols or of phenols. The preferred phosphorus compounds are however phosphites of lower aliphatic alcohols with up to 4 carbon atoms and the phenyl phosphinates of lower aliphatic alcohols with up to 4 carbon atoms, which may be substituted in the aryl radical by groups which are inert under the reaction conditions, such as halogen and alkoxy radicals.

For the production of the phosphorus compounds of the general Formula I, which can be described as bis-phosphonates and bis-phosphinates, there are especially suitable compounds which have been derived from para-xylene and its substitution products and which contain reactive chlorine, bromine or iodine atoms in the side chains. They include 1,4-dichloromethylbenzene, 1,4-dibromomethylbenzene, 1,4 - dichlormethyl-2-methyl-5-bromobenzene, 1,4-dichlormethyl-2,5-dimethoxybenzene, 1,4 - dichlormethyl-2,3,5,6-tetramethylbenzene, 1,4 - dichloromethyl - 2,5 - dimethylbenzene, 1,4 - dichlormethyl-2,3 - methylene-dihydroxybenzene, 9,10-dichlormethyl-anthracene, 1,4-dichlormethyl-2-benzene - sulfonic acid, 1,4 - dichlormethyl-2-nitro-benzene, 1,4-dichlormethyl-2-mercaptobenzene, 1,4-di-(carbethoxychlormethyl) - benzene and 1,4-di(cyanochlormethyl)-benzene.

As compounds of the general Formula I there may however also be used compounds of the naphthalene or anthracene series which contain methylene-phosphonate or methylene-phosphinate groups in para-position.

As compounds containing carbonyl groups there are suitable all compounds which contain one or more aldehyde and/or keto groups, thus aliphatic, cycloaliphatic, araliphatic and aromatic aldehydes and ketones, dialdehydes, diketones, ketoaldehydes. Aromatic aldehydes, which may be substituted are especially suitable, or in general those oxo compounds of which the carbonyl groups are connected by way of a direct C—C linkage with a resonance-stabilized 6-π-electronic system.

As examples there may be specified: formaldehyde, acetaldehyde, acrolein, crotonaldehyde, acetone, methoxyacetone, glyoxal, beta-formylcrotonic acid esters, citral, methylheptenone, benzaldehyde, acetophenone, benzophenone, furfurol, phenylacetaldehyde, para-nitrobenzaldehyde, piperonal, 2,6-dichlor-benzaldehyde, para-dimethylaminobenzaldehyde, para - acetoxyaminobenzaldehyde, 2,6 - dimethoxybenzaldehyde, 4-methyl-2,6-dimethoxy-benzaldehyde, para-isopropyl-benzaldehyde, 2,4 - dimethoxybenzaldehyde, 4 - methoxy-benzaldehyde, para-phenoxy - benzaldehyde, 3-methyl-4-methoxy-benzaldehyde, 2,4,6-trimethyl-benzaldehyde, 3,4-methylenedihydroxy-2-methoxy-benzaldehyde, N-(beta-diethylaminoethyl)-para-amino-benzaldehyde, 4-(beta-hydroxyethyl)-hydroxy-benzaldehyde, para-amino-benzaldehyde, para-cyano-benzaldehyde, para-carbethoxy-benzaldehyde, 2,5-endoethylene-Δ³-tetra-hydro-benzaldehyde, 4-hexahydropyranyloxy-benzaldehyde, 4-tetrahydrofuranyloxy-benzaldehyde, cinnamaldehyde, phenylpentadienal, terephthalaldehyde, 2-chlor-4-formylbenzenesulfonic acid, 2-chlor-4-formylbenzenesulfonic acid amide, thymol aldehyde, alpha-naphthaldehyde, tetrahydronaphthalene-1-aldehyde, anthracene-9-aldehyde, phenanthrene-9-aldehyde, ferrocene aldehyde, acridine-9-aldehyde, fluorene-2-aldehyde, acenaphthene-5-aldehyde, 3,4-benzpyrane-5-aldehyde, 9-chloranthracene-10-aldehyde, 2,4-dimethylpyrrole-5-aldehyde, 2-methyl-3-carbethoxypyrrole-5-aldehyde, 2-carboethoxy-indole-3-aldehyde, indole-3-aldehyde, naphthostyryl-aldehyde, thiophene-2-aldehyde, pyrene-3-aldehyde, N-methylcarbazole-3-aldehyde, anthraquinone-2-aldehyde, anthrapyrimidine-aldehyde, anti-pyrine-aldehyde, 2-mercapto-4-methyl-glyoxaline-5-aldehyde, 2-formyl-methylene-3,4-dimethyl-thiazoline, diphenyl-4-aldehyde, diphenylene, oxide-1-aldehyde, carbazole-2-aldehyde, thionaphthene-2-aldehyde, tolyl aldehyde, 1,4-diphenyl-naphthalene-2-aldehyde, pyridine-2-aldehyde, pyridine-4-aldehyde, quinoline-2-aldehyde, benzthiazole-2-aldehyde, 3-methyl-quinoline-2-aldehyde, 4-nitro-diphenyl-4'-aldehyde, Bz.1-benzanthrone-aldehyde, 5-methyl-isoxazole-3-aldehyde, 3-tetrahydrofuryl-oxindole-2-aldehyde, 3-tetrahydrofuranyloxy-thionaphthene-2-aldehyde, 4-methoxy-1-naphthaledhyde and methyl terephthalate.

As proton acceptors there are suitable especially basic compounds, such as alkali or alkaline earth hydroxides, alkali or alkaline earth alcoholates and alkali or alkaline earth amides.

The process is advantageously carried out in inert solvents. Examples of these are hydrocarbons, such as toluene and xylene, or alcohols, such as methanol, ethanol, isopropanol, butanols, glycols, hexanols, cyclohexanol and cyclo-octanol, and also ethers, such as di-isopropyl ether, tetrahydrofurane, dimethyltetrahydrofurane and dioxane, as well as dimethyl sulfoxide. Polar organic solvents are especially suitable, such as formamide, dimethylformamide and N-methylpyrrolidone. Some of the reactions may also be carried out in aqueous medium.

The reaction temperature depends on the nature of the components to be reacted, especially on the nature of the compound containing a carbonyl group and of the proton acceptor; as a rule it lies between about 0° and +100° C. It is recommendable to ascertain the most favorable reaction temperature in each case by a preliminary experiment.

The process may be carried out for example by bringing together the compound containing a carbonyl group, the compound of the general Formula I and advantageously a solvent and then introducing into the mixture while stirring the proton acceptor, possibly dissolved or suspended. It is also possible first to add the proton acceptor only to the compound of the general Formula I and then to add the compound containing a carbonyl group. As a rule the reactants are used in stoichiometrical amounts, but in some cases an excess or deficiency of one or other of the reactants is of advantage. The reaction usually proceeds with strong evolution of heat so that it may be necessary to apply cooling. The working up of the reaction mixture takes place in the usual way, for example by adding water or methanol and possibly an acid, such as acetic acid or sulfuric acid, and separating the deposited product.

The advantages of the process according to this invention as compared with the known methods lie in the more ready accessibility of the initial materials, the higher purity of the end products, the yields which as a rule are higher and especially in the universal applicability of the process.

The substance obtainable by the new process all exhibit fluorescence and are suitable as light-protecting agents, as stabilizers and as intermediate products for pharmaceuticals, pesticides and dyestuffs. Their use as optical brighteners is especially advantageous because in order to obtain an optimum effect they need be used in considerably smaller amounts than the known products. The more intensely colored products are also suitable as pigment dyestuffs for coloring plastics and they are characterized by high luminosity.

The following examples will further illustrate this invention but the invention is not restricted to these examples. The parts are parts by weight unless otherwise specified; parts by weight bear the same relation to parts by volume as the gram to the cc.

*Example 1*

A solution of 175 parts of para-xylylene dichloride in 500 parts by volume of xylene is added gradually to 350 parts of triethyl phosphite at 140° to 150° C. The reaction mixture is heated under reflux for 12 hours. The ethyl chloride formed is thereby distilled off. Then the solvent is driven off at atmospheric pressure and the volatile constituents then removed under reduced pressure. There are obtained as a residue 380 parts of para-xylylene-tetraethyl diphosphonate as a viscous yellowish oil which soon solidifies to form flaky crystals which melt at 73° to 74° C. after purification by recrystallization from petroleum ether.

38 parts of para-xylylene-tetraethyl diphosphonate are dissolved in 250 parts by volume of dimethylformamide while heating. 25 parts of benzaldehyde are added to the solution and then, while stirring powerfully, 40 parts of a 30% solution of sodium methylate in methanol. In a strongly exothermic reaction there is thereby formed 1,4-distyrylbenzene which is precipitated in yellowish fluorescent leaflets. After cooling, 250 parts by volume of methanol are added to the reaction mixture and the pH is adjusted to 7 by adding glacial acetic acid. The reaction product is filtered off by suction and washed with methanol. After dissolution in dimethylformamide and reprecipitation, 21 parts of 1,4-distyrylbenzene of the melting point 261° to 262° C. are obtained.

*Example 2*

8 parts of para-xylylene-tetraethyl diphosphonate are dissolved at 50° C. in 50 parts by volume of N-methyl-pyrrolidone. A solution of 10 parts of anthraquinone-2-aldehyde in 100 parts by volume of N-methylpyrrolidone are added to the solution and then, with strong stirring at 40° to 50° C., 15 parts of a 30% sodium methylate solution in methanol are allowed to flow in. After a few minutes crystals are deposited from the dark brown colored solution. The reaction mixture is stirred for 1 hour, then 150 parts by volume of methanol are added and neutralization effected by adding glacial acetic acid. The brilliant orange colored precipitate is filtered off by suction and washed with methanol. In this way there are obtained 7.1 parts of almost pure 1,4-bis-(beta-anthraquinonyl-(2)-styryl)-benzene. After recrystallization from N-methyl-pyrrolidone, the product melts at 362° to 364° C.

*Example 3*

94.5 parts of para-xylylene-tetraethyl diphosphonate and 90 parts of para-nitrobenzaldehyde are dissolved in 250 parts by volume of dimethylformamide. 100 parts of a 30% solution of sodium methylate in methanol is dripped in while stirring. The contents of the reactor become dark brown in color with considerable evolution of heat. After a few minutes, crystals are precipitated. The reaction mixture is stirred for another hour, then diluted with 200 parts by volume of methanol and adjusted to pH 7 by adding glacial acetic acid. The golden orange colored crystals are filtered off by suction, washed with methanol and recrystallized from dimethylformamide. In this way 41 parts of 1,4-bis-(para-nitrostyryl)-benzene are obtained as magnificent gold orange lustrous leaflets which decompose at 280° C.

*Example 4*

114 parts of para-xylylene-tetraethyl diphosphonate and 100 parts of para-dimethylamino-benzaldehyde are dissolved in 200 parts by volume of dimethylformamide. 120 parts of a 30% solution of sodium methylate in methanol are dripped in at 60° C. while stirring powerfully. The solution acquires an intense brilliant yellow color. Greenish yellow fine crystals gradually separate out. The reaction mixture is kept at 65° to 70° C. for 5 hours and then 200 parts by volume of methanol are added. The yellow substance is filtered off by suction, washed and dissolved and reprecipitated from dimethylformamide. There are thus obtained 51 parts of 1,4-bis-(para-dimethyl-aminostyryl)-benzene in the form of small quince yellow needles which decompose at 360° C.

*Example 5*

20 parts of para-xylylene-tetraethyl diphosphonate and 20 parts of 1-naphthaldehyde are dissolved in 150 parts by volume of dimethylformamide. While shaking well, 12 parts of a 30% solution of sodium methylate in methanol are added to the mixture. In an exothermic reaction there is formed 1,4-dinaphthostyryl-(1)-benzene which is immediately precipitated from the reaction medium in greenish yellow crystals. The mixture is allowed to stand for ½ hour and then the reaction product is fiiltered off by suction and recrystallized from dimethylformamide. 15.2 parts of 1,4-dinaphthostyryl-benzene are obtained in the form of greenish yellow leaflets which melt at 222° to 223° C.

*Example 6*

95 parts of para-xylylene-tetraethyl diphosphonate and 90 parts of piperonal are dissolved in 250 parts by volume of dimethylformamide. While stirring well, 100 parts of a 30% solution sodium methylate in methanol are dripped in rapidly. In a strongly exothermic reaction, yellowish crystals are precipitated. The mixture is stirred for another hour, diluted with 250 parts by volume of methanol, neutralized with glacial acetic acid and the precipitated reaction product filtered off by suction and dissolved in dimethylformamide and reprecipitated. There are thus obtained 53 parts of 1,4-bis-(3' 4' dihydroxymethylenestyryl)-benzene as pale yellow lustrous leaflets of the melting point 266° to 268° C.

*Example 7*

95 parts of para-xylylene-tetraethyl diphosphonate and 80 parts of meta-cyanobenzaldehyde are dissolved in 250 parts by volume of dimethylformamide. To this mixture, while stirring powerfully, there are quickly added 100 parts of a 30% solution of sodium methylate in methanol. After a few minutes there is formed in an exothermic reaction 1,4-bis-(meta-cyanostyryl)-benzene which is precipitated in small yellowish crystals. The mixture is stirred for another hour, then diluted with 250 parts by volume of methanol, then adjusted to pH 7 with glacial acetic acid and filtered off by suction. By dissolution in dimethylformamide and reprecipitation, 55.6 parts of 1,4-bis(meta-cyanostyryl)-benzene of the melting point 256° to 258° C. are obtained.

*Example 8*

A mixture of 23.5 parts of 2,5-bis-(chlormethyl)-hydroquinone dimethyl ether and 40 parts of triethyl phosphite is heated to 120° C. The disengagement of ethyl chloride begins at this temperature. The reaction temperature is gradually raised to 180° C. and kept there for 5 hours. After cooling, the crystalline product is recrystallized from a mixture of benzene and cylclohexane. 29 parts of 2,5-dimethoxy-1,4-xylylene-tetraethyl diphosphonate are obtained in colorless crystals of the melting point 117° to 118° C.

6 parts of the phosphonate thus prepared and 3 parts of benzaldehyde are dissolved in 25 parts by volume of dimethylformamide. 2 parts of a 30% solution of sodium methylate in methanol are allowed to flow into the said mixture. Yellow crystals separate and considerable heating up occurs. The whole is stirred at 30° to 40° C. for another 2 hours, 20 parts by volume of methanol are added, neutralization effected with glacial acetic acid and the reaction product filtered off by suction. By recrystallization from dimethyl-formamide there are obtained 3 parts of 1,4-distyryl-2,5-dimethoxybenzene as yellow crystals which melt above 300° C. and exhibit an intense azure-blue fluorescene in solution.

*Example 9*

5.2 parts of 2,5-dimethoxy-1,4-xylylene-tetraethyl diphosphonate and 4 parts of para-nitrobenzaldehyde are dissolved in 30 parts by volume of dimethylformamide. 10 parts of a 30% solution of sodium methylate in methanol are added. Deep red crystal needles separate out with strong heating up. The reaction mixture is diluted with 20 parts by volume of methanol after half an hour, neutralized with glacial acetic acid and then dissolved in and reprecipitated from dimethylformamide. 5 parts of 1,4-bis-(para-nitrostyryl)-2,5-dimethoxybenzene are obtained; it melts at 270° C. with decomposition.

*Example 10*

100 parts of triethyl phosphite are heated to 90° C. A solution of 106 parts of 1,4-bis-chlormethyl-2,5-dichlor-benzene in 200 parts by volume of cyclohexane is gradually dripped in. As soon as the cyclohexane has distilled off, the reaction temperature is raised to 190° C. and kept there for 5 hours. The reaction product which crystallizes out upon cooling, is recrystallized from a mixture of benzene and cyclohexane. In this way there are obtained 73 parts of 2,5-dichlor-1,4-xylylene-tetraethyl diphosphonate of the melting point 104° to 106° C. as colorless crystals.

40 parts of 2,5-dichlor-1,4-xylylene-tetraethyl diphosphonate and 20 parts of benzaldehyde are dissolved in 150 parts by volume of N-methylpyrrolidone. While stirring powerfully, 40 parts of a 30% solution of sodium methylate in methanol are rapidly introduced. Crystals separate out in an exothermic reaction. The reaction mixture is stirred for another 2 hours following the addition of the methylate, then diluted with 100 parts by volume of methanol and neutralized with glacial acetic acid. The greenish yellow crystals are filtered off by suction and dissolved in and reprecipitated from dimethylformamide. 27 parts of 1,4-distyryl-2,5-dichlorbenzene of the melting point 207° to 209° C. are obtained.

*Example 11*

16 parts of para-xylylene-tetraethyl diphosphonate and 20 parts of vanillin-tetrahydrofuranyl ether are dissolved in 30 parts by volume of dimethylformamide. 20 parts of a 30% solution of sodium methylate in methanol are added while stirring. After a few minutes, pale yellow leaflets are precipitated. The reaction mixture is stirred for another hour, then diluted with 50 parts by volume of methanol and the precipitate filtered off by suction. By recrystallization from dimethylformamide there are obtained 11 parts of 1,4-bis-(4'-alpha-tetrahydrofuranyloxy-3'-methoxy-styryl)-benzene in the form of greenish yellow crystals of the melting point 177° to 178° C.

4 parts of the said substance are dissolved in 20 parts by volume of boiling glacial acetic acid. After about 1 minute, 1,4 - bis - (3'-methoxy-4'-hydroxystyryl-benzene separates in yellowish crystals which melt at 277° to 279° C.

Example 12

378 parts of para-xylene-tetraethyl diphosphonate and 370 parts of 2,4-dimethoxybenzaldehyde are dissolved in 600 parts by volume of dimethylformamide. 380 parts of a 30% solution of sodium methylate in methanol are dripped in at 30° to 35° C. at such a rate that the heat of reaction keeps the mixture at 35° to 40° C. Crystals precipitate after 5 minutes. After supplying the alkali, the reaction mixture is stirred for another 2 hours, then diluted with 300 parts by volume of methanol and adjusted to pH 7 with glacial acetic acid. The reaction product is filtered off by suction, washed with methanol and recrystallized from dimethyl-formamide. In this way there are obtained 290 parts of 1,4-bis-(2′,4′-dimethoxystyryl)-benzene as greenish yellow crystals of the melting point 184° to 186° C.; solutions thereof have an intense blue fluorescence.

Example 13

38 parts of para-xylene-tetraethyl diphosphonate and 46 parts of 3-formylphthalic acid dimethyl ester are dissolved in 100 parts by volume of dimethylformamide. 40 parts of a 30% solution of sodium methylate in methanol are quickly added at 30° to 40° C. while stirring powerfully. The reaction proceeds with considerable evolution of heat and after a few minutes yellow crystals are precipitated. After cooling, the whole is stirred for another hour, then diluted with 100 parts by volume of methanol and adjusted to pH 7 with glacial acetic acid. The reaction product is filtered off by suction, washed with methanol and recrystallized from dimethylformamide. There are thus obtained 37 parts of 1,4-bis-(3′,4′-dicarbmethoxy-styryl)-benzene in the form of yellow leaflets of the melting point 223° to 224° C. The solutions of this compound have an intense azure-blue fluorescence.

Example 14

38 parts of para-xylene-tetraethyl diphosphonate and 35 parts of 3,4-dichlorbenzaldehyde are dissolved in 200 parts by volume of dimethylformamide. While stirring intensively, 40 parts of a 30% solution of sodium methylate in methanol are allowed to flow in a 40° C. so rapidly that the reaction heat set free keeps the reaction mixture at 40° C. Greenish yellow crystals are precipitated after a few minutes. After the addition of alkali is ended, the whole is stirred for another hour, then 200 parts by volume of methanol are added and adjusted to pH 7 with glacial acetic acid. The reaction product is filtered off by suction, washed with methanol and then recrystallized from dimethylformamide. In this way there are obtained 33 parts of 1,4-bis-(3′,4′-dichlorstyryl)-benzene in the form of greenish yellow needles which melt at from 211° to 213° C.

Example 15

38 parts of para-xylene-tetraethyl diphosphonate are dissolved in 150 parts by volume of dimethylformamide. 30 parts of cinnamaldehyde are added and then 40 parts of a 30% solution of sodium methylate in methanol are added at such a rate that the mixture is kept at 40° to 50° C. by the heat of reaction set free. Golden yellow leaflets are precipitated a few hours after commencing the addition of alkali. The mixture is stirred for another two hours, then diluted with 150 parts by volume of methanol, adjusted to pH 7 with glacial acetic acid and filtered off by suction. The reaction product may be recrystallized from dimethylformamide. In this way there are obtained 28 parts of 1,4-bis-(omega-phenyl-butadienyl)-benzene as yellow leaflets of the melting point 287° to 288° C.

Example 16

38 parts of para-xylene-tetraethyl diphosphonate and 30 parts of para-cyanobenzaldehyde are dissolved in 200 parts by volume of dimethylformamide. 40 parts of a 30% solution of sodium methylate in methanol are added to the mixture while stirring strongly. After a few minutes, 1,4-bis-(para-cyanostyryl)-benzene is formed in an exothermic reaction and precipitated in brilliant yellow small parallelepipeds. The mixture is stirred for another hour, then diluted with 100 parts by volume of methanol, then adjusted to pH 7 with glacial acetic acid and filtered off by suction. By dissolution in dimethylformamide and reprecipitation therefrom there are obtained 29 parts of 1,4-bis-(para-cyanostyryl)-benzene of the melting point 278° to 279° C.

Example 17

38 parts of para-xylene-tetraethyl diphosphonate and 33 parts of terephthalaldehydic acid methyl ester are dissolved in 150 parts by volume of dimethyl sulfoxide. 40 parts of a 30% solution of sodium methylate in methanol are added at 30° C. at such a rate that the said temperature is maintained. The first crystals are deposited after only a few minutes. After the addition of alkali is ended, the whole is stirred for another hour, diluted with 200 parts by volume of methanol and adjusted to pH 7 with glacial acetic acid. The reaction product is filtered off by suction and recrystallized from dimethylformamide. 32 parts of 1,4-bis-(para-carbmethoxystyryl)-benzene are obtained as yellowish leaflets which melt at from 318° to 320° C., partly with decomposition.

Example 18

38 parts of para-xylene-tetraethyl diphosphonate and 33 parts of isophthalaldehydic acid methyl ester are dissolved in 150 parts by volume of dimethylformamide. 40 parts of a 30% solution of sodium methylate in methanol are added at 40° C. in such a way that the mixture is kept constantly at the same temperature by the reaction heat set free. Crystals are precipitated within a few minutes. When the alkali addition is complete, the whole is stirred for another hour, diluted with 200 parts by volume of methanol and adjusted to pH 7 with glacial acetic acid. The reaction product is filtered off by suction, washed with methanol and recrystallized from dimethylformamide. 28 parts of 1,4-bis-(meta-carbmethoxy-styryl)-benzene are obtained as pale yellow leaflets which melt at from 206° to 208° C.

Example 19

A mixture of 35 parts of para-xylylene dichloride and 85 parts of phenyl diethoxy phosphine is heated for 4 hours at 190° to 200° C. Small proportions of low boiling products are then removed in vacuo and the solid residue is recrystallized from dimethylformamide. 69 parts of para-xylylene-bis-phenylphosphinic acid ethyl ester are contained in the form of colorless needles of the melting point 186° to 187° C.

22 parts of para-xylylene-bis-phenylphosphinic acid ethyl ester and 16 parts of piperonal are dissolved in 50 parts by volume of dimethylformamide. At 40° C. there are added while stirring 20 parts of a 30% solution of sodium methylate in methanol. 1,4-bis-(3′,4′-methylenedihydroxystyryl)-benzene is formed in an exothermic reaction and precipitated in pale yellow scales. The mixture is stirred for another hour, then mixed with 100 parts by volume of methnaol and neutralized with glacial acetic acid. The deposited reaction product is filtered off by suction and recrystallized from dimethylformamide. There are thus obtained 13 parts of 1,4-bis-(3′,4′-methylene-dihydroxystyryl)-benzene as pale yellow lustrous leaflets of the melting point 266° to 268° C.

Example 20

22 parts of para-xylylene-bis-phenylphosphonic acid ethyl ester and 11 parts of benzaldehyde are dissolved in 40 parts by volume of dimethylformamide. 20 parts of a 30% solution of sodium methylate in methanol are added at 40° C. while stirring. In a strongly exothermic reaction there is thereby formed 1,4-distyrylbenzene which is precipitated in yellowish leaflets. After cooling, the reaction mixture is diluted with 100 parts by volume of methanol and adjusted to pH 7 with glacial acetic acid. The reaction product is filtered off by suction and washed with methanol. After recrystallization from dimethylformamide, there are obtained 11 parts of 1,4-bis-styryl-benzene of the melting point 261° to 262° C.

*Example 21*

A solution of 17 parts of para-xylylene dichloride in 50 parts by volume of xylene is gradually added at 130° C. to 140° C. to 35 parts of trimethyl phosphite. The mixture is heated for 12 hours under reflux. The methyl chloride formed distils off. The solvent is then driven off. The last traces of volatile constituents are removed in a high vacuum. The residue, crude para-xylylene-tetramethyl diphosphonate, and 40 parts of N-methyl-carbazole-3-aldehyde are dissolved in 150 parts by volume of dimethylformamide and then while stirring powerfully 40 parts of a 30% solution of sodium methylate in methanol are added. 1,4 - bis-[beta-N-methylcarbazolyl-(3)-vinyl]-benzene is formed in an exothermic reaction and is precipitated in needles having a strong yellow fluorescence. After stirring for another hour, 100 parts by volume of methanol are added to the mixture which is then neutralized with glacial acetic acid and filtered by suction. By recrystallization from dimethylformamide there are obtained 29 parts of lustrous yellow crystals of the melting point 288° to 289° C.

*Example 22*

A solution of 38 parts of para-xylylene-tetraethyl diphosphonate and 40 parts of diphenyl-4-aldehyde in 200 parts by volume of absolute xylene is allowed to flow, while stirring strongly, so rapidly into a suspension of 10 parts of sodamide in 100 parts by volume of absolute benzene that the temperature of the reaction mixture is kept between 50° and 60° C. After stirring for another hour, the reaction mixture has cooled down to room temperature again. The mixture is filtered by suction and the solid product digested with water and carefully neutralized with glacial acetic acid. It is again filtered off by suction, washed with a large amount of water, dried and recrystalized from dimethylformamide. 28 parts of 1,4-bis-(para-phenyl-styryl)-benzene are obtained in this way as yellowish crystals which melt at 330° C. with decomposition.

*Example 23*

A solution of 17 parts of para-xylylene dichloride in 50 parts by volume of xylene is gradually added at 130° to 140° C. to 60 parts of tributyl phosphite. The mixture is heated for 12 hours under reflux. Then the solvent and the butyl chloride formed are distilled off, the residue is heated for another hour at 180° C. to 190° C. and then freed from low boiling constituents in a high vacuum. The residue, crude para-xylylene-tetrabutyl diphosphonate, and 57 parts of vanillin benzyl ether are dissolved in 300 parts by volume of dimethyl formamide and, while stirring, 45 parts of a 30% solution of sodium methylate in methanol are added. A greenish yellow finely crystalline precipitate is thrown down in a strongly exothermic reaction. After the addition of the alkali the whole is stirred for another hour, then diluted with 200 parts by volume of methanol, neutralized with glacial acetic acid and filtered by suction. By recrystallization from dimethylformamide there are obtained 31 parts of 1,4-bis-(4'-benzyloxy-3'-methoxystyryl)-benzene as greenish-yellow crystals which melt at 226° to 227° C.

*Example 24*

A solution of 38 parts of para-xylylene-tetraethyl diphosphonate and 30 parts of ortho-cyanobenzaldehyde in 100 parts by volume of dimethylformamide is allowed to flow while stirring into a suspension of 37 parts of potassium tertiary butylate in 250 parts of dimethylformamide at 40° to 50° C. 1,4-bis-(2'-cyanostyryl)-benzene begins to separate after a few minutes. After stirring for another hour 200 parts by volume of methanol are added, neutralization is effected with glacial acetic acid and the product filtered off by suction. By recrystallization from dimethylformamide there are obtained 24 parts of greenish yellow needles with a melting point of 229° to 231° C.

*Example 25*

38 parts of para-xylylene-tetraethyl diphosphonate and 45 parts of para-alpha-tetrahydrofuranyloxybenzaldehyde are dissolved in 100 parts by volume of dimethylformamide. 45 parts of a 30% solution of sodium methylate in methanol are dripped in while stirring at 40° to 50° C. After the alkali has been added, the whole is stirred for another 2 hours, diluted with 200 parts by volume of methanol, filtered by suction and the product recrystallized from dimethylformamide. In this way there are obtained 29 parts of 1,4-bis-(4'-alpha-tetrahydrofuranyloxystyryl)-benzene as yellowish crystals which melt at 255° C. with decomposition. By boiling up in glacial acetic acid for a short time there is obtained therefrom 1,4-bis-(para-hydroxystyryl)-benzene which, after recrystallization from dimethylformamide, melts at 360° C. with decomposition.

*Example 26*

19 parts of para-xylylene-tetraethyl diphosphonate and 22 parts of 4-formyl-benzoic acid morpholide are dissolved in 80 parts by volume of N-methylpyrrolidone. A saturated solution of 6 parts of potassium hydroxide in isopropanol is dripped in at 40° to 50° C. After stirring for another 2 hours, the product is diluted with 50 parts by volume of methanol and neutralized with glacial acetic acid. The precipitate is filtered off by suction and recrystallized from dimethylformamide. 7 parts of 1,4-bis-(para-carb-morpholido-styryl)-benzene are obtained as greenish yellow crystals which melt at 320° to 322° C.

*Example 27*

19 parts of para-xylylene-tetraethyldiphosphonate and 22 parts of 3-formyl-benzoic acid morpholide are dissolved in 100 parts by volume of dimethylformamide. 30 parts of a 30% solution of potassium ethylate in ethanol are allowed to flow in while stirring. In an exothermic reaction there is formed a yellowish precipitate which after stirring for another hour, diluting with 50 parts by volume of methanol and neutralizing with glacial acetic acid is filtered off by suction. By recrystallization from dimethylformamide there are obtained 17 parts of 1,4-bis-(meta-carbmorpholido-styryl)-benzene as yellowish crystals which melt at from 276° to 278° C.

*Example 28*

15 parts of magnesium ethylate are introduced into a solution of 19 parts of para-xylylene-tetraethyl diphosphonate and 20 parts of diphenyl-4-aldehyde in 50 parts by volume of N-methylpyrrolidone and the whole is heated to 50° to 60° C. After stirring for another hour, it is diluted with 50 parts by volume of methanol, neutralized with 10% sulfuric acid and filtered off by suction. The precipitate is recrystallized from dimethylformamide. 4.5 parts of 1,4-bis-(para-phenyl-styryl)-benzene are obtained as yellowish crystals which melt at 330° C. with decomposition.

*Example 29*

44 parts of 2,5-dimethoxy-1,4-xylylene-tetraethyl diphosphonate and 35 parts of piperonal are dissolved in 150 parts by volume of dimethylformamide. 40 parts of a 30% solution of sodium methylate in methanol are dripped in at 40° C. while stirring. In an exothermic reaction there is formed a lustrous lemon yellow precipitate, which after stirring for another hour is filtered off by suction and recrystallized from dimethylformamide. In this way there are obtained 28 parts of 1,4-bis-(3',4'- methylenedihydroxystyryl) - 2,5 - dimethoxybenzene as lemon yellow crystals which melt at 245° to 247° C.

*Example 30*

44 parts of 2,5-dimethoxy-1,4-xylylene-tetraethyl diphosphonate and 35 parts of 2,4-dimethoxy-benzaldehyde are dissolved in 100 parts by volume of dimethylformamide. 40 parts of a 30% solution of sodium methylate in methanol are dripped in at 40° C. while stirring. In an exothermic reaction there is formed an orange colored precipitate which after stirring for an hour is filtered off by suction and recrystallized from dimethylformamide. 26 parts of 1,4-bis-(2',4'-dimethoxystyryl)-2,5-dimethoxybenzene are obtained as orange colored crystals of the melting point 197° to 199° C.

*Example 31*

44 parts of 2,5-dimethoxy-1,4-xylylene-tetraethyl diphosphonate and 33 parts of para-dimethylaminobenzaldehyde are dissolved in 80 parts by volume of dimethylformamide. 45 parts of a 30% solution of sodium methylate in methanol are allowed to flow in at 40° to 50° C. while stirring. In an exothermic reaction there is formed an orange colored precipitate which is filtered off by suction after stirring for an hour and recrystallized from dimethylformamide. 23 parts of 1,4-bis-(4'-dimethylaminostyryl)-2,5-dimethoxybenzene are obtained as orange colored crystals which melt at from 255° to 257° C.

*Example 32*

44 parts of 2,5-dimethoxy-1,4-xylylene-tetraethyl diphosphonate and 30 parts of para-chlorbenzaldehyde are dissolved in 80 parts by volume of dimethylformamide. 40 parts of 30% solution of sodium methylate in methanol are allowed to flow in at 40° C. while stirring. In an exothermic reaction there is formed a yellow precipitate which after stirring for an hour is filtered off by suction and recrystallized from dimethylformamide. 27 parts of 1,4-bis-(4'-chlorstyryl)-2,5-dimethoxybenzene are obtained as yellow crystals which melt at 225° to 226° C.

*Example 33*

44 parts of 2,5-dimethoxy-1,4-xylylene-tetraethyl diphosphonate and 37 parts of 2,6-dichlorbenzaldehyde are dissolved in 100 parts by volume of dimethylformamide. 40 parts of a 30% solution of sodium methylate in methanol are allowed to flow in at 40° C. In an exothermic reaction there is formed a lustrous yellow precipitate which after stirring for an hour is filtered off by suction and recrystallized from dimethylformamide. 9 parts of 1,4-bis-(2',6'-dichlorstyryl)-2,5-dimethoxybenzene are obtained as yellow crystals which melt at 246° to 247° C.

We claim:

1. 1,4 - bis - (4' - alpha - tetrahydrofuranyloxy - 3'-methoxy-styryl)-benzene.

2. A process for the production of compounds of the 1,4-divinylbenzene series which comprises reacting a compound of the formula:

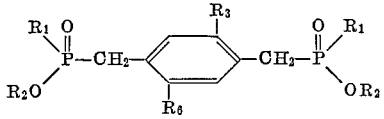

wherein $R_1$ represents alkoxy of 1 to 4 carbon atoms, $R_2$ represents alkyl of 1 to 4 carbon atoms, and $R_3$ and $R_6$ each represent a member selected from the group consisting of hydrogen, alkyl of 1 to 4 carbon atoms, alkoxy of 1 to 4 carbon atoms and halogen, with an aromatic aldehyde in an organic solvent and in the presence of a proton acceptor selected from the group consisting of alkali and alkaline earth metal alcoholates of low-molecular weight alcohols containing up to 4 carbon atoms at a temperature of from 0° C. to 100° C.

3. A process as claimed in claim 2 wherein said reaction is carried out in the presence of an inert polar organic solvent and an alkali metal alcoholate as the proton acceptor.

4. 1,4-bis-(3',4'-dicarbomethoxy-styryl)-benzene.

5. 1,4-bis-(4'-benzyloxy-3'-methoxy-styryl)-benzene.

6. 1,4 - bis - [beta - N - methylcarbazoyl - (3) - vinyl]-benzene.

7. A compound selected from the group consisting of 1,4-bis-(4'-carbomorpholidostyryl)-benzene and 1,4-bis-(3'-carbomorpholidostyryl)-benzene.

8. A compound selected from the group consisting of 1,4-bis-(o-cyanostyryl)-benzene, 1,4-bis-(m-cyanostyryl)-benzene and 1,4-bis-(p-cyanostyryl)-benzene.

References Cited by the Examiner
UNITED STATES PATENTS

| | | | |
|---|---|---|---|
| 2,527,426 | 10/50 | Keller et al. | 260—507 |
| 3,067,259 | 12/62 | Bailey | 260—613 |

FOREIGN PATENTS 196,343   3/58   Austria.

OTHER REFERENCES

Borsche: Annalen der Chemie, vol. 386, pages 352, 353, 359, 361, 363, 369, 371 and 372 (1911).

Buu-Hoi et al.: Rec. Trav. Chim., vol. 74, pages 1119 to 1124 (1955).

Conant et al.: "The Chemistry of Organic Compounds," 4th ed., page 549, The Macmillan Co., N.Y. (1952).

Friedrich et al.: Chem. Ber., vol. 92, pages 2944 to 2952 (November 10, 1959).

Horner et al.: Chemische Berichte, vol. 91, pages 61–63 (1958).

Campbell et al.: Journ. of Org. Chem., vol 24, pages 1246–1251 (September 1959).

Horner et al.: Chem. Ber., vol. 92, pages 2499 to 2505 (October 13, 1959).

Kauffman: Ber. d. Deut. Chem. Ges., vol. 50, pages 515–525 (1917).

Ruggli et al.: Helv. Chim. Acta, vol. 14, pp. 1250 to 1265 (1931).

Ruggli et al.: Helv. Chim. Acta, vol. 18, pages 1216, 1219, 1229, 1230–1, 1234, and 1237 to 1239 (1935).

Ruggli et al.: Helv. Chim. Acta, vol. 19, pages 5–15 (1936).

Schmitt et al.: Bull. Soc. Chem., France, vol. 23, pages 636–642 (1956).

WALTER A. MODANCE, *Primary Examiner.*

NICHOLAS S. RIZZO, *Examiner.*